No. 811,928. PATENTED FEB. 6, 1906.
A. S. JOHNSON.
SAFETY STARTING DEVICE FOR GAS ENGINES.
APPLICATION FILED MAY 14, 1904.
2 SHEETS—SHEET 1.
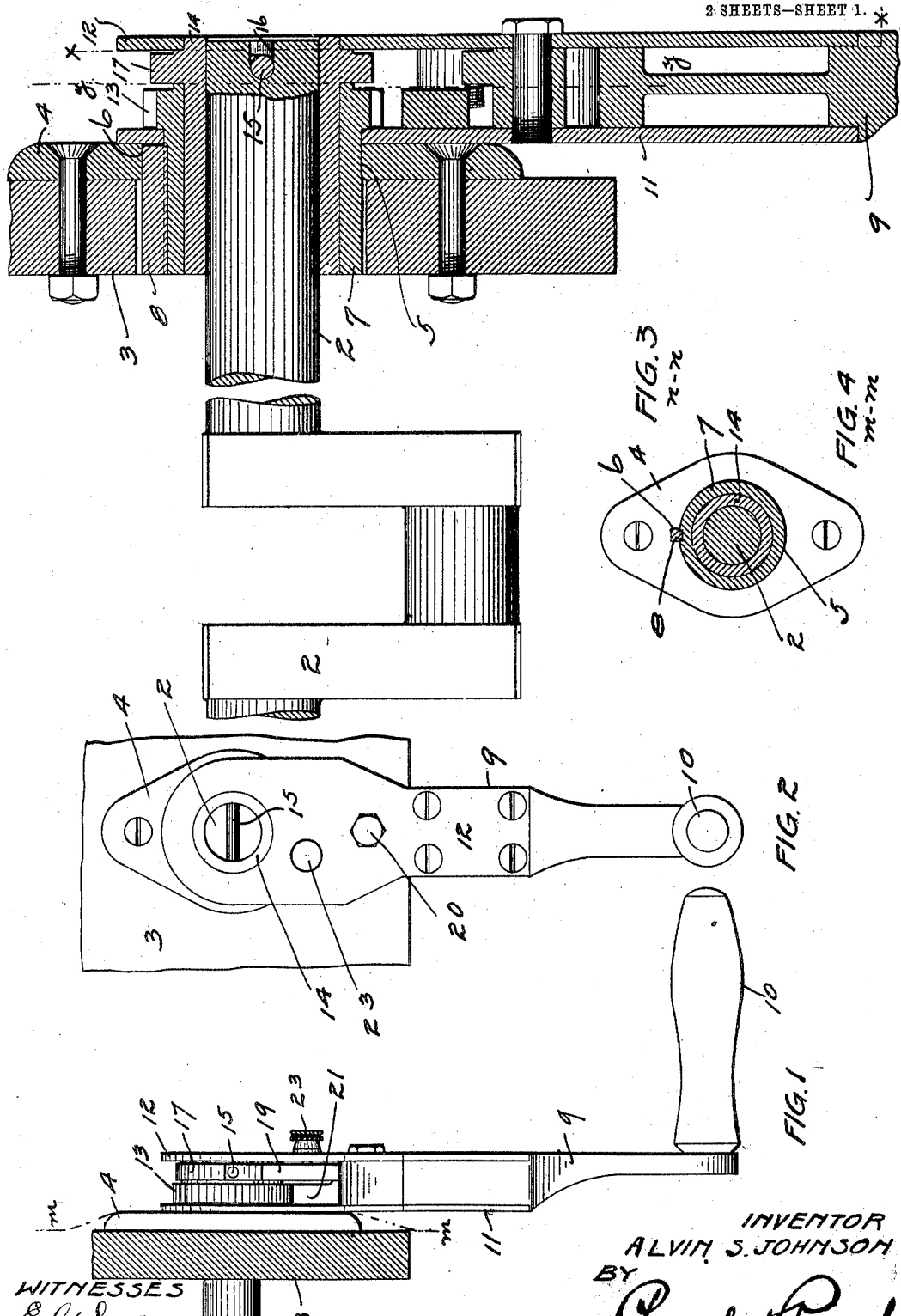
INVENTOR
ALVIN S. JOHNSON
BY
Paul & Paul
HIS ATTORNEYS
WITNESSES
E. J. Staude
M. Hagerty

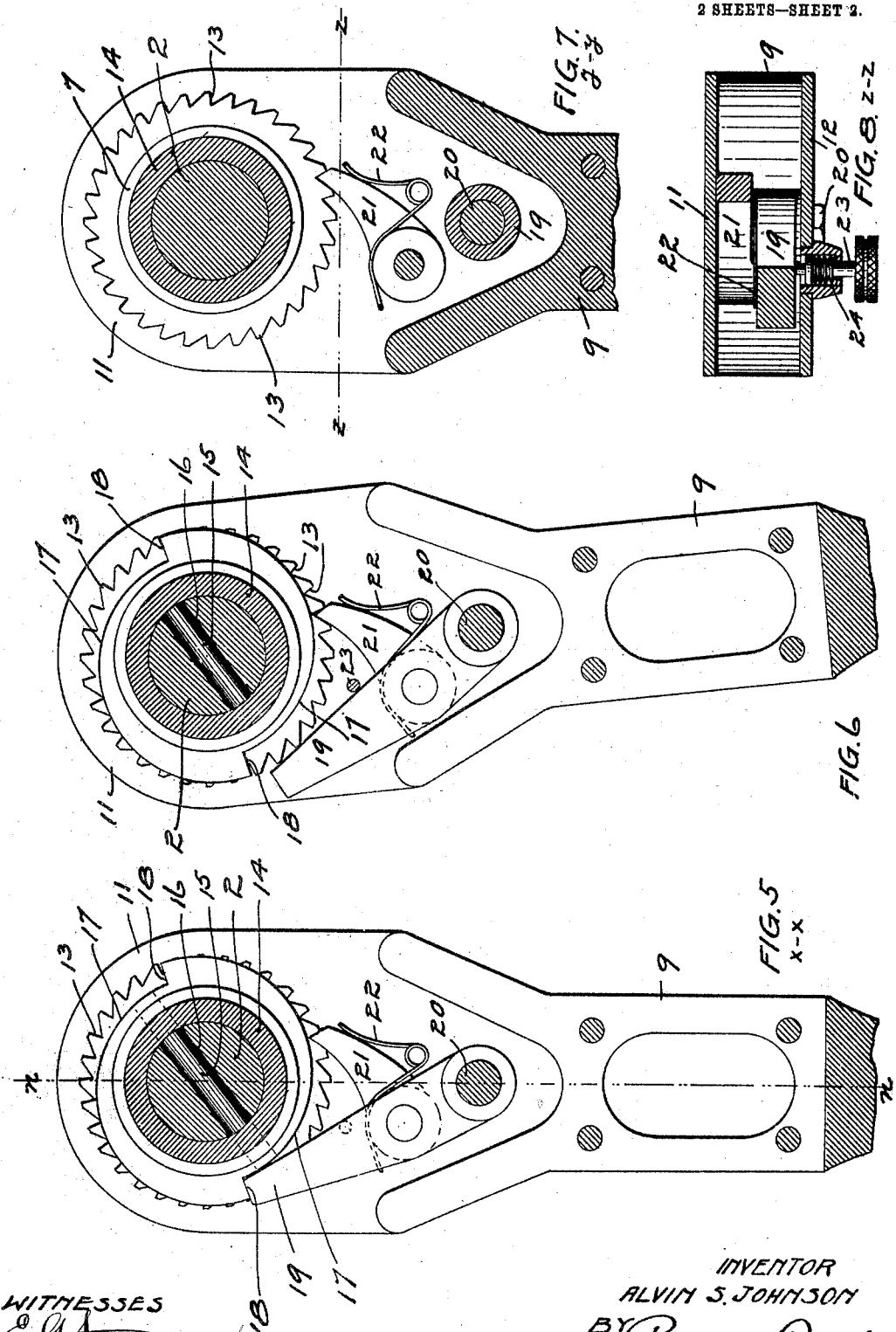

UNITED STATES PATENT OFFICE.

ALVIN S. JOHNSON, OF MINNEAPOLIS, MINNESOTA, ASSIGNOR OF ONE-FOURTH TO F. J. MOORE, OF MINNEAPOLIS, MINNESOTA.

SAFETY STARTING DEVICE FOR GAS-ENGINES.

No. 811,928.

Specification of Letters Patent.

Patented Feb. 6, 1906.

Application filed May 14, 1904. Serial No. 207,893.

*To all whom it may concern:*

Be it known that I, ALVIN S. JOHNSON, of Minneapolis, Hennepin county, Minnesota, have invented certain new and useful Improvements in Safety Starting Devices for Gas-Engines, of which the following is a specification.

My invention relates to gas-engines, and particularly to that type used on automobiles; and the object of my invention is to provide means for preventing injury to the operator in case the engine should start backward or "kick back" and revolve the crank-shaft and hand turning-crank in the opposite direction from that in which the operator is turning the hand-crank.

The invention consists generally in providing a locking device between the hand-crank and shaft and means for automatically releasing said device should the crank be whirled backward by the backward revolution of the crank-shaft.

Further, the invention consists generally in various constructions and combinations, all as hereinafter described, and particularly pointed out in the claims.

In the accompanying drawings, forming part of this specification, Figure 1 is a side view of a safety starting device embodying my invention. Fig. 2 is a front view of the same. Fig. 3 is a sectional view on the line $n\ n$ of Fig. 5. Fig. 4 is a sectional detail view on the line $m\ m$ of Fig. 1. Fig. 5 is a section on the line $x\ x$ of Fig. 3, showing the mechanism in its locked position. Fig. 6 is a similar view showing the mechanism in its unlocked position. Fig. 7 is a sectional view in detail on the line $y\ y$ of Fig. 3. Fig. 8 is a section on the line $z\ z$ of Fig. 7.

In the drawings, 2 represents a gas-engine crank-shaft of ordinary construction, and 3 is a portion of an automobile car or body through which the crank-shaft projects for convenience in starting the engine.

4 is a plate secured to the car 3 over the shaft-opening therein and having a hole 5 to receive said shaft and a slot 6 in the edge of said hole. A sleeve 7 is fitted over the end of said shaft and within the hole 5 and has a key 8, that enters the slot 6 and locks the said sleeve against revolution. A hand-crank 9 is provided, having a suitable handle 10 and plates 11 and 12, that are secured to the part 9 by screws or other suitable means and are removable to permit access to the locking mechanism.

The plate 11 is loosely mounted on the sleeve 7 and turns freely thereon when the hand-crank is manipulated. A series of ratchet-teeth 13 are provided on the outer end of the sleeve 7 between the plates 11 and 12 on the hand-crank, and these teeth form a ratchet-wheel that is fixed with respect to the hand-crank, and the shaft 2 has a second sleeve 14 concentric with the sleeve 7 and fitting snugly between it and the shaft and provided at its outer end with a pin 15, that enters a slot 16 in the end of the shaft and locks the two parts together. The plate 12 fits over the outer end of the sleeve 14 and when secured to the part 9 locks the said sleeve firmly in place on the crank-shaft. A cam-ring 17 is provided on the sleeve 14, having shoulders or stops 18 upon opposite sides, and these shoulders are engaged by a pawl 19, pivoted on a pin 20 between the plates 11 and 12. This pawl drops by gravity upon the surface of the cam-ring 17 and engaging one of the shoulders 18 automatically locks the hand-crank on the shaft.

A click 21 is pivoted on the pawl 19 and normally held in engagement with the ratchet-teeth 13 by a spring 22, which also draws the click and pawl together and holds the latter on the cam-surface. As shown in Figs. 5 and 6, the click is pivoted on the pawl at a point intermediate to its pivot and the end that engages the shoulder 18, and the ratchet-teeth are so formed that when the crank is turned toward the right to revolve the crank-shaft and start the engine the click will slide over the ratchet-teeth. If the crank-shaft starts backward and transmits its movement to the crank, the pressure on the pawl 19 will be transmitted to the click 21, and as it cannot move backward over the ratchet-teeth it will throw the pawl out of engagement with the shoulder with which it may be in contact, and the crank-shaft can then be revolved backward without affecting the hand-crank or endangering the limbs of the operator.

I prefer to provide some means for locking the pawl after its automatic disengagement from the cam-ring shoulder, and I therefore provide a pin 23, mounted in the plate 12 and yieldingly held in engagement with the surface of the pawl by a spring 24. As soon as the pawl is thrown out of engagement with the shoulder the pin will be shot in behind the pawl, as indicated in Fig. 6, and will prevent it from dropping back upon the cam-ring. When the operator desires to couple the hand-crank and shaft, he will withdraw the pin 23 and allow the pawl to drop by gravity upon the cam-ring and then turn the end of the crank until the pawl engages one of the shoulders 18, when the crank will again be coupled with the shaft, and the starting operation can be repeated.

It will be noted that the locking and unlocking of the crank-arm on the shaft is entirely automatic, that it is only necessary for the operator to turn the crank toward the right and it will lock itself on the shaft, and upon starting the engine if there should be any "kicking back" of the crank-shaft, with a tendency to whirl the crank backward, it will instantly become automatically released from the shaft, and no possible injury can come to the operator.

I claim as my invention—

1. The combination, with a gas-engine crank-shaft, of an arm loosely mounted thereon, mechanism for locking said arm on said shaft when it is turned in one direction, mechanism for tripping said locking mechanism upon the reverse movement of said shaft and arm, and means for holding said locking mechanism in its unlocked or inoperative position after being tripped, for the purpose specified.

2. In a device of the class described, the combination, with a crank-shaft having stops or shoulders, of a loosely-mounted crank-arm, a pawl thereon arranged to engage said shoulders when said arm is turned in one direction, mechanism for tripping said pawl upon the reverse movement of said arm and shaft, and a spring-pressed pin arranged to drop behind said pawl and hold it in its unlocked position.

3. The combination, with an automobile-car body, of a crank-shaft projecting therethrough, two sleeves arranged on said shaft, one within the other, the outer sleeve being fixed and having a series of external ratchet-teeth, the inner sleeve being connected with said shaft and provided with suitable stops or shoulders, a crank-arm loosely mounted on said sleeves, a pawl pivoted on said arm and adapted to bear upon said movable sleeve and engage said shoulders when said arm is turned in one direction, and a click pivoted on said pawl between its pivot and point of engagement with said shoulders and engaging the teeth of said ratchet to trip said pawl when said shaft and arm are turned in the other direction.

In witness whereof I have hereunto set my hand this 11th day of May, 1904.

ALVIN S. JOHNSON.

In presence of—
RICHARD PAUL,
M. HAGERTY.